(12) United States Patent  
Suzuki (10) Patent No.: US 7,607,787 B2  
(45) Date of Patent: Oct. 27, 2009

(54) LIGHT SOURCE UNIT AND PROJECTOR SYSTEM

(75) Inventor: Yukio Suzuki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 747 days.

(21) Appl. No.: 11/293,476

(22) Filed: Dec. 1, 2005

(65) Prior Publication Data

US 2006/0126341 A1 Jun. 15, 2006

(30) Foreign Application Priority Data

Dec. 14, 2004 (JP) ............................. 2004-361534

(51) Int. Cl.
*G03B 21/20* (2006.01)
*G03B 21/28* (2006.01)
*F21V 7/00* (2006.01)
*F21V 33/00* (2006.01)

(52) U.S. Cl. .................... 353/102; 362/309; 362/347; 353/99

(58) Field of Classification Search .............. 353/30, 353/37, 94, 98, 102, 99; 359/366, 728; 362/299, 362/308, 268, 328, 583, 309, 347; 356/124
See application file for complete search history.

(56) References Cited

U.S. PATENT DOCUMENTS

| | | | | |
|---|---|---|---|---|
| 1,064,010 A | * | 6/1913 | Roebuck ...................... 353/94 |
| 1,085,795 A | * | 2/1914 | Boyle ......................... 362/299 |
| 3,732,417 A | * | 5/1973 | Nordquist .................... 362/309 |
| 4,355,350 A | | 10/1982 | Mader ........................ 362/347 |
| 4,642,740 A | * | 2/1987 | True ........................... 362/268 |
| 5,790,305 A | | 8/1998 | Marcellin-Dibon et al. . 359/364 |
| 6,575,598 B2 | * | 6/2003 | Weigert et al. .............. 362/268 |
| 6,997,565 B2 | | 2/2006 | Sekiguchi et al. ........... 353/102 |
| 7,068,446 B2 | | 6/2006 | Jacobson et al. ............ 359/726 |
| 7,075,713 B2 | | 7/2006 | Arenberg ..................... 359/359 |
| 7,178,922 B2 | | 2/2007 | Sekiguchi et al. ........... 353/102 |

(Continued)

FOREIGN PATENT DOCUMENTS

EP 0 198 676 A2 10/1986

(Continued)

OTHER PUBLICATIONS

English translation of JP 61-275701 A, Osukaro Moreno Jiru, Dec. 5, 1986, 30 pages, cited on applicant's IDS of Apr. 22, 2009.*

*Primary Examiner*—Melissa J Koval
(74) *Attorney, Agent, or Firm*—Frishauf, Holtz, Goodman & Chick, P.C.

(57) ABSTRACT

A light source unit which is reduced in size while securing a certain quantity of light by increasing the utilization efficiency of light and a projector system utilizing the light source unit. The light source unit includes a reflector whose internal surface is planished to provide a mirror reflection effect and which is formed with a lamp accommodation opening and a light emitting opening, a light source including a bulb which radiates light and a lamp comprising an electrode introducing portion that guides electrodes into the bulb, and a condenser which lies on an optical axis of the light radiated from the lamp and which is adapted to gather the light that is radiated from the lamp and that is reflected on the reflector.

8 Claims, 8 Drawing Sheets

U.S. PATENT DOCUMENTS

| | | | |
|---|---|---|---|
| 7,195,388 B2 * | 3/2007 | Hori | 362/583 |
| 7,490,956 B2 | 2/2009 | Hough | 362/247 |
| 2002/0114160 A1 | 8/2002 | Weigert | 362/277 |
| 2004/0070735 A1 * | 4/2004 | Sekiguchi et al. | 353/30 |
| 2004/0246451 A1 | 12/2004 | Fujisawa et al. | 353/98 |
| 2005/0078302 A1 * | 4/2005 | Bergendahl et al. | 356/124 |
| 2006/0171150 A1 | 8/2006 | Shimaoka | 362/304 |
| 2006/0197925 A1 | 9/2006 | Suzuki | 353/102 |
| 2007/0115664 A1 * | 5/2007 | Suzuki | 362/268 |

FOREIGN PATENT DOCUMENTS

| | | |
|---|---|---|
| JP | 61-100712 A | 5/1986 |
| JP | 61-275701 A | 12/1986 |
| JP | 4-104241 A | 4/1992 |
| JP | 6-51401 A | 2/1994 |
| JP | 7-174974 A | 7/1995 |
| JP | 10-288757 A | 10/1998 |
| JP | 2002-298625 A | 10/2002 |
| JP | 2002-350778 A | 12/2002 |
| WO | WO 2005/008329 A1 | 1/2005 |

* cited by examiner

LIGHT SOURCE UNIT AND PROJECTOR SYSTEM

BACKGROUND OF THE INVENTION

The present invention relates to a light source unit and a projector system including the light source unit, and more particularly to a light source unit that is made smaller in size without reducing the utilization efficiency of light from a light source and a projector system including the light source unit.

Projector systems are such that light emitted from a light source unit is passed through a color wheel, is thereafter caused to enter a mirror tunnel so as to be made into light having a uniform luminous intensity distribution and is then projected on a screen while the quantity of light of each pixel is being changed over by a micro mirror device or a liquid crystal display element, so that an image is displayed on the screen.

Figure 14:
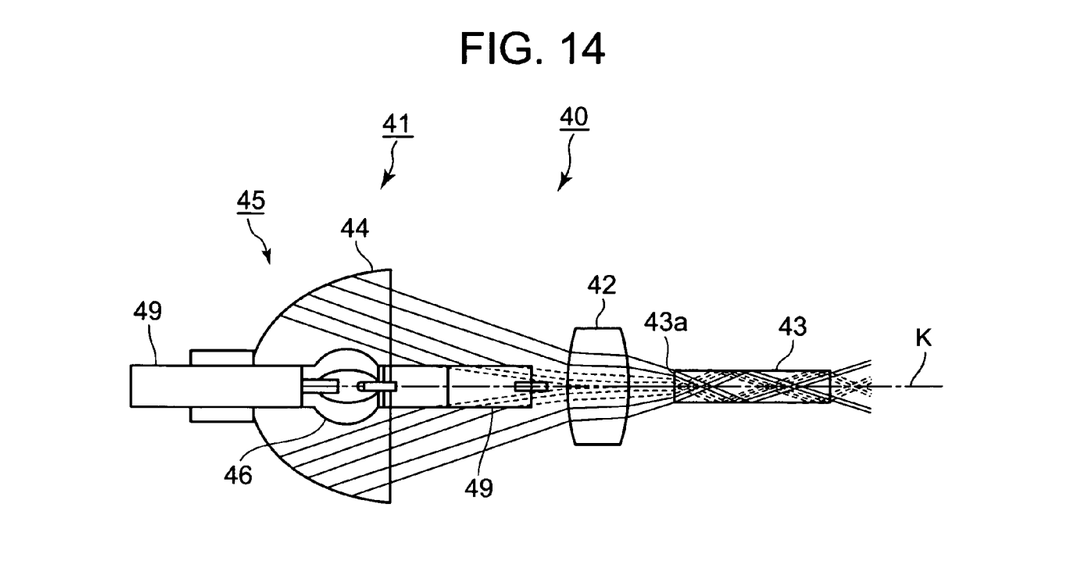
FIG. 14 is a sectional view of a related-art light source unit.

As shown in FIG. 14, a light source unit 40 is made up of a light source 41 which emits light, a convex lens 42 disposed on an optical axis K for gathering light emitted from the light source 41 and a mirror tunnel 43 which light emerging from the convex lens 42 is made to enter to shine thereon (refer to Patent Document No. 1).

The light source 41 is made up of a reflector 44 and a lamp 45 inserted into the reflector 44. The lamp 45 is made up of a bulb 46 and electrode introducing portions 49, 49, and the bulb 46 is inserted so as to be positioned within the reflector 44. Note that the illustration of a color wheel is omitted in FIG. 14.

Here, part of the light that is emitted from the bulb 46 and is then reflected on an internal wall of the reflector 44 impinges on the electrode introducing portion 49, whereby the quantity of light is dampened. In addition, the convex lens 42 cannot sufficiently illuminate a light incident surface 43a of the mirror tunnel 43 with the light reflected by the reflector 44.

Due to this, the light source unit 40 needs to have a certain size or larger in order to secure a certain quantity of light, and hence, a projector system incorporating the light source unit 40 so enlarged tends to be enlarged, resulting in a problem that the projector system is not necessarily easy to carry and set.

While the light source unit is preferred to be small in so as to make the whole of the projector system small, it is a conventional idea that the lamp in the light source unit must have a certain size or larger so as to secure a necessary quantity of light.

[Patent Document No. 1] Japanese Unexamined Patent Publication No. 6-51401

SUMMARY OF THE INVENTION

According to a preferred aspect of the invention, there is provided a light source unit including a reflector whose internal surface is planished to provide a mirror reflection effect and which is formed with a lamp accommodation opening and a light emitting opening, a light source comprising a bulb which radiates light and a lamp including an electrode introducing portion that guides electrodes into the bulb, and a condenser which lies on an optical axis of the light radiated from the lamp and which is adapted to gather the light that is radiated from the lamp and that is reflected on the reflector, wherein the condenser comprises a lens having a recessed portion which is formed in a central portion of at least one of lens surfaces thereof, wherein the lamp is inserted into an interior of the reflector from the lamp accommodation opening, and wherein the bulb is disposed such that a focal point of the radiated light that is reflected on an inner wall of the reflector is not positioned on the electrode introducing portion but is positioned between the electrode introducing portion and a light gathering surface of the condenser such that a circle centered at the optical axis of the light emitted from the light source is formed in the position of the focal point.

In addition, according to another preferred aspect of the invention, there is provided a projector system including a light source unit including a reflector whose internal surface is planished to provide a mirror reflection effect and which is formed with a lamp accommodation opening and a light emitting opening, a light source including a bulb which radiates light and a lamp comprising an electrode introducing portion that guides electrodes into the bulb, and a condenser which lies on an optical axis of the light radiated from the lamp and which is adapted to gather the light that is radiated from the lamp and that is reflected on the reflector, wherein the condenser comprises a lens having a recessed portion which is formed in a central portion of at least one of lens surfaces thereof, wherein the lamp is inserted into an interior of the reflector from the lamp accommodation opening, and wherein the bulb is disposed such that a focal point of the radiated light that is reflected on an inner wall of the reflector is not positioned on the electrode introducing portion but is positioned between the electrode introducing portion and a light gathering surface of the condenser such that a circle centered at the optical axis of the light emitted from the light source is formed in the position of the focal point, a mirror tunnel which guides light that emerges from the condenser lens, a lens which gathers light that emerges from the mirror tunnel, a micro mirror device which receives light that emerges from the lens so as to project an image, and a projection lens which enlarges the image projected by the micro mirror device.

DESCRIPTION OF THE PREFERRED EMBODIMENT

Next, an embodiment of the invention will be described by reference to the accompanying drawings. However, note that claims are not limited by what is illustrated in the drawings.

Figure 1:
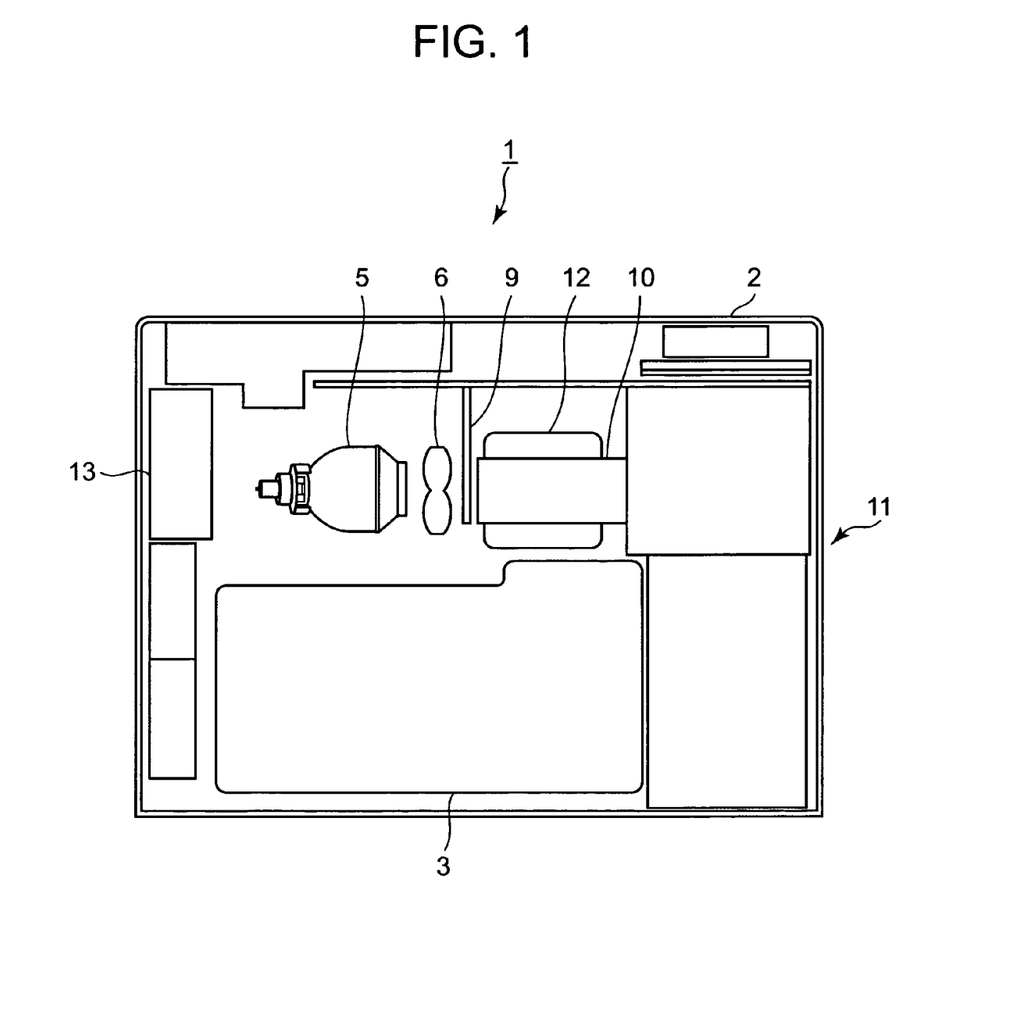
FIG. 1 is a plan view of a projector system according to a first embodiment of the invention with an upper surface removed to shown an inside configuration thereof.

As shown in FIG. 1, a projector system 1 includes a case 2, and a power supply circuit board 3 having a power supply mounted thereon is disposed in the case 2 for controlling the whole of the projector system 1. A light source 5 that is to be controlled by the power supply circuit board 3 is disposed in the case 2 at a position near a central portion thereof, and a condenser lens 6 is disposed in a traveling direction of light emitted from the light source 5. A color wheel 9 is disposed in a traveling direction of light that emerges from the condenser lens 6 for converting the light emerging from the condenser lens 6 into respective colors of red (R), green (G) and blue (B). A mirror tunnel 10 is disposed in a traveling direction of light that has transmitted through the color wheel 9, and a projection unit 11 is disposed in a traveling direction of light that emerges from the mirror tunnel 10 for projecting an image on to a screen. In addition, a multiblade fan 13 for sending cooling air into the light source unit 5 to cool the light source 5 and an axial fan 12 for discharging the air sent into the light source 5 by the multiblade fan 13 from the interior of the projector system 1 are provided in the projector system.

Figure 2:
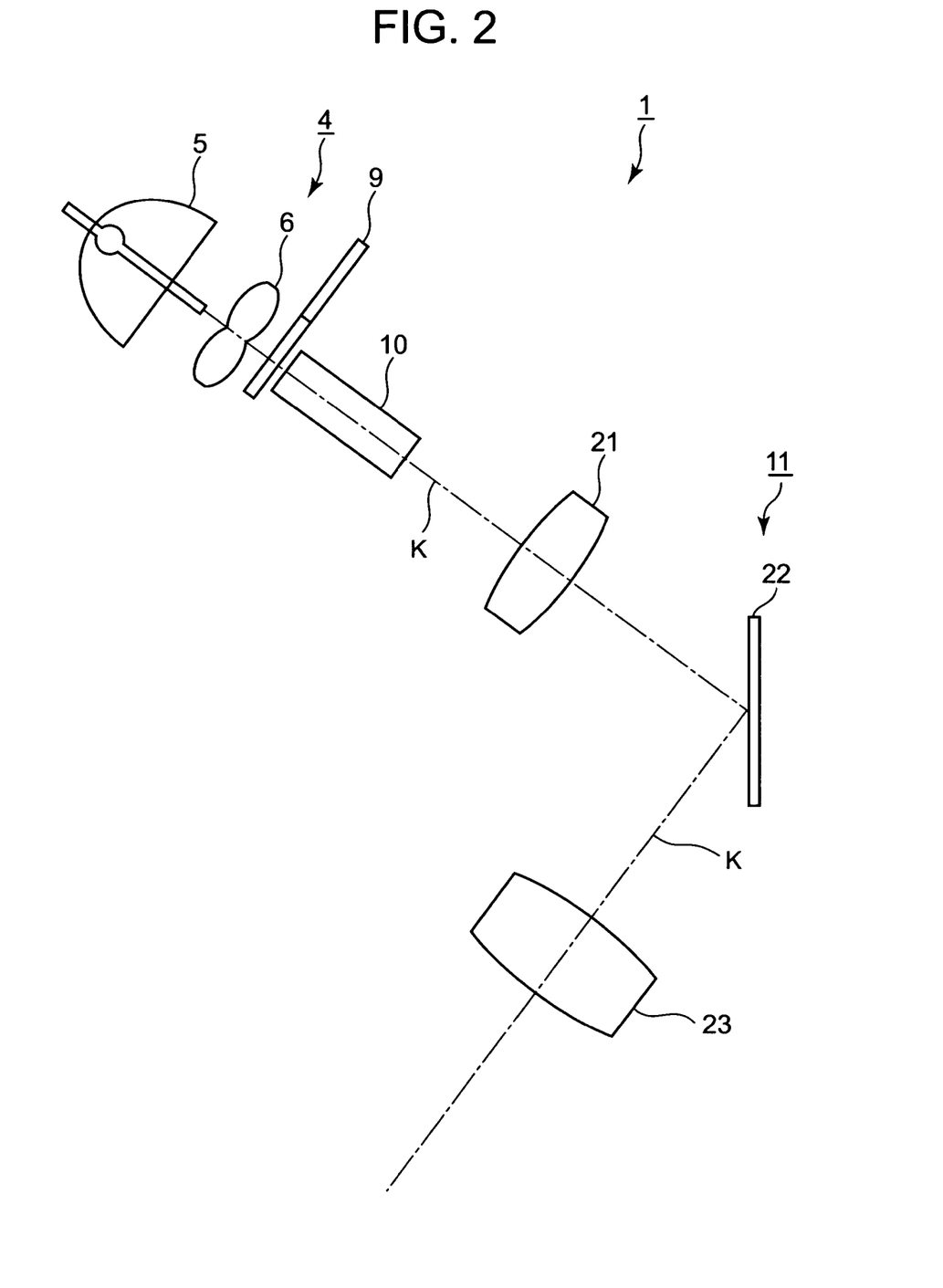
FIG. 2 is a schematic diagram which shows the configuration of the projector system according to the invention.

FIG. 2 is a schematic diagram which shows the configuration of the projector system 1. A light source unit 4 is provided in the interior of the projector system 1, and the light source unit 4 is made up of the light source 5 which radiates light and a condenser lens 6 which gathers the light radiated from the light source 5.

The condenser lens 6 is provided in the traveling direction of light emitted from the light source 5 for gathering the light so emitted, and the color wheel 9 is disposed in the traveling direction of light that emerges from the condenser lens 6 for converting the light emerging from the condenser lens 6 into the respective colors of R, G and B. The mirror tunnel 10 is disposed in the traveling direction of light that has transmitted through the color wheel 9. The projection unit 11 is disposed in the traveling direction of light that emerges from the mirror tunnel 10, and a lens 21 and a micro mirror device 22 which makeup the projection unit 11 are disposed on an optical axis K of light that emerges from the mirror tunnel 10, the micro mirror device 22 being disposed in a traveling direction of light that emerges from the lens 21 in such a manner as not to oppositely face the lens 21. A projection lens 23 is disposed in a traveling direction of light that is reflected by the micro mirror device 22. Note that the color wheel 9 may be disposed on a light emerging side of the mirror tunnel 10 from which light emerges.

Figure 3:
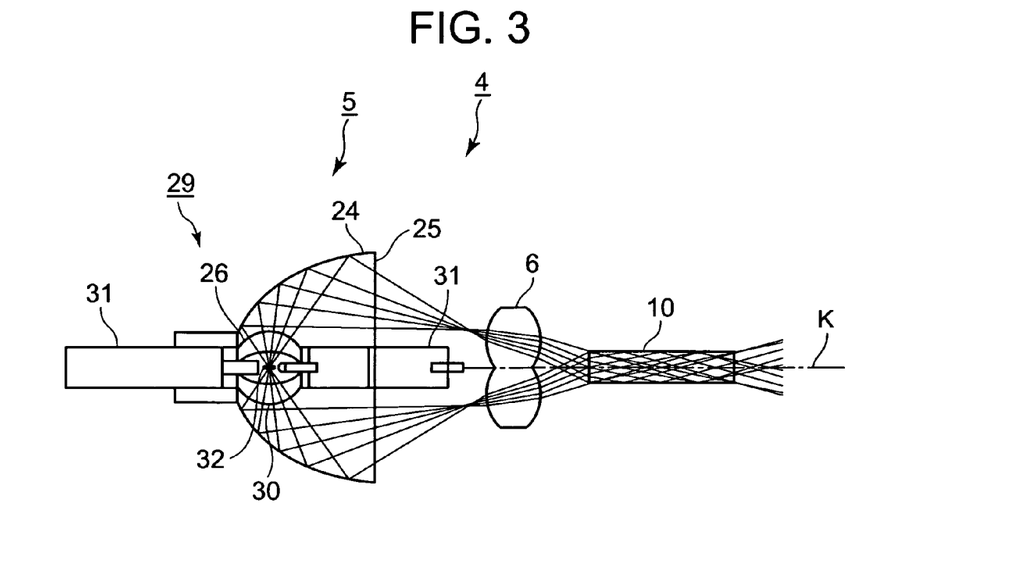
FIG. 3 is a longitudinal sectional view of a light source unit according to the invention.

FIG. 3 is a schematic longitudinal sectional view of the light source unit 4. Note that the illustration of the color wheel 9 is omitted in FIG. 3.

The light source 5 is made up of a reflector 24 and a lamp 29 accommodated within the reflector 24.

The reflector 24 is formed into a semi-spherical shape and an internal surface thereof is planished so as to provide a mirror reflection effect, an opening (hereinafter, referred to as a "light emitting opening 25") being provided on a color wheel 9 side thereof. In addition, an opening is provided in a proximal portion of the reflector 24 (hereinafter, the opening formed in the proximal portion of the reflector 24 will be referred to as a "lamp accommodation opening 26"), so that the lamp 29 is made to be accommodated into the reflector 24 from the lamp accommodation opening 26.

The lamp 29 is made up of a bulb 30 which emits light and electrode introducing portions 31, 31 provided at both ends of the bulb 30 through which electrodes are introduced into the interior of the bulb 30. In addition, an arc 32 is provided in the interior of the bulb 30 for generating an electric discharge. The bulb 30 is disposed near the lamp accommodation opening 26 in the reflector 24 in such a manner that a focal point position of light radiated from the bulb 30 and reflected by an internal wall of the reflector 24 is formed further forward in a traveling direction of the reflected light than the electrode introducing portion 31.

Figure 4:
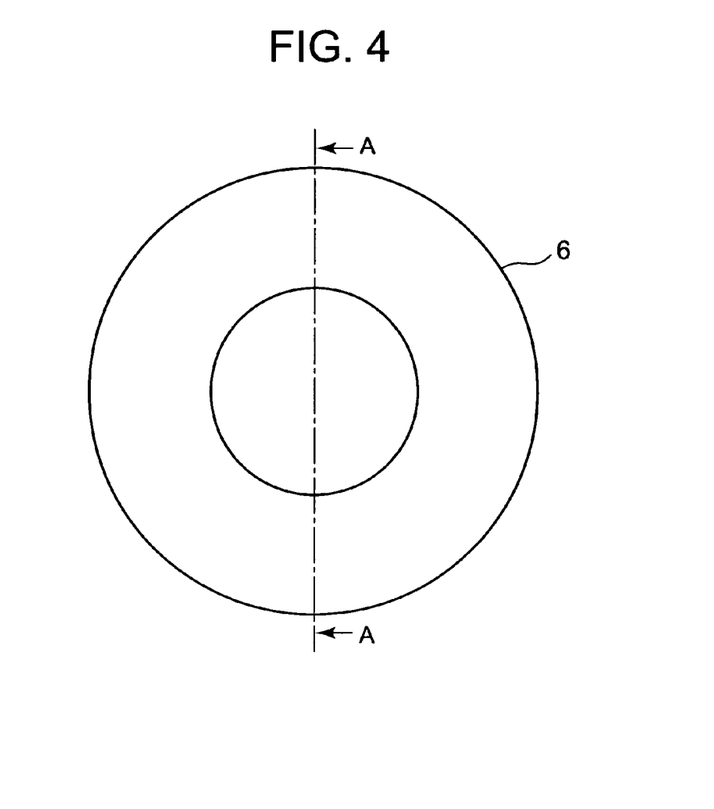
FIG. 4 is a front view of a condenser lens.
Figure 5:
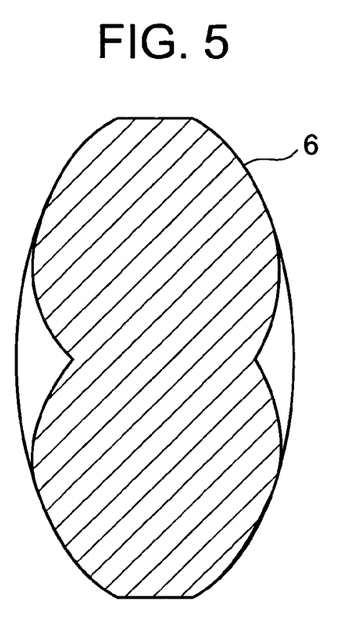
FIG. 5 is a sectional view of the condenser lens shown in FIG. 4 taken along the line A-A' in the same figure.

The condenser lens 6 for gathering reflected light is disposed along the optical axis K in the traveling direction of light reflected by the reflector 24. FIG. 4 is a front view which shows one of lens surfaces of the condenser lens 6, and FIG. 5 is a sectional view of the condenser lens 6 shown in FIG. 4 taken along the line A-A' in the same figure. As shown in FIGS. 4 and 5, the condenser lens 6 is a convex lens in which recess portions are provided at central portions of light gathering convex surfaces on both sides of the condenser lens 6.

The area of a light gathering surface (hereinafter, referred to as an "effective range") on the lens surface of the condenser lens 6 which faces the light source 5 is made to become larger than that of a light emerging surface (hereinafter, referred to as an "effective range") of the lens surface of the condenser lens 6 which faces the color wheel 9.

Figure 6:
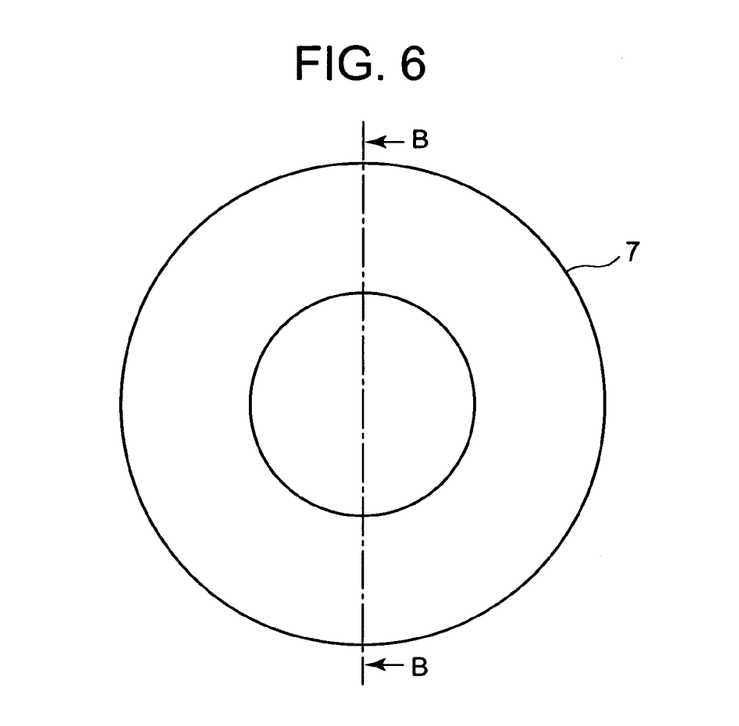
FIG. 6 is a front view of a condenser lens.
Figure 7:
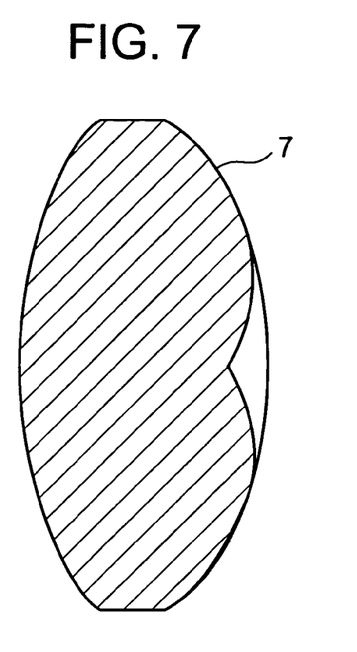
FIG. 7 is a sectional view of the condenser lens shown in FIG. 6 taken along the line B-B' in the same figure.

Note that a condenser lens 7 may be used which has, as shown in FIGS. 6 and 7, a normal convex surface on one lens surface and a convex surface with a recess portion provided at a central portion thereof on the other lens surface thereof. This condenser lens 7 may be disposed with either of the lens surfaces thereof directed towards the light source 5.

Figure 8:
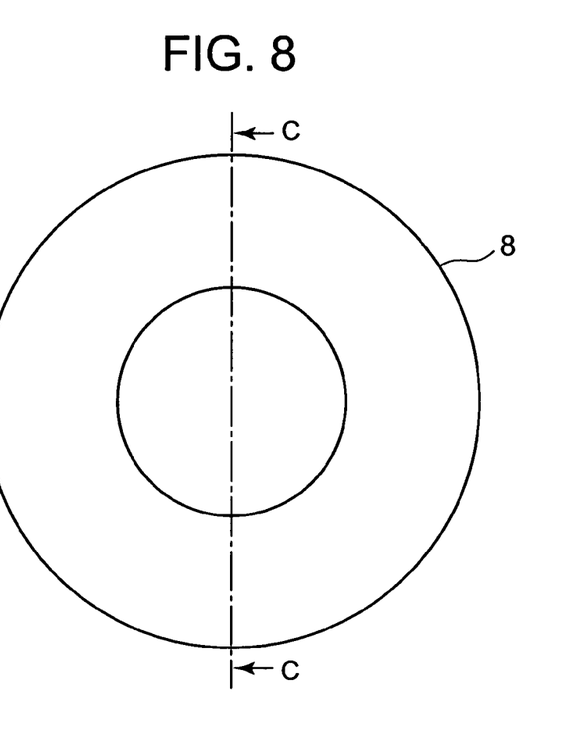
FIG. 8 is a front view of a condenser lens.
Figure 9:
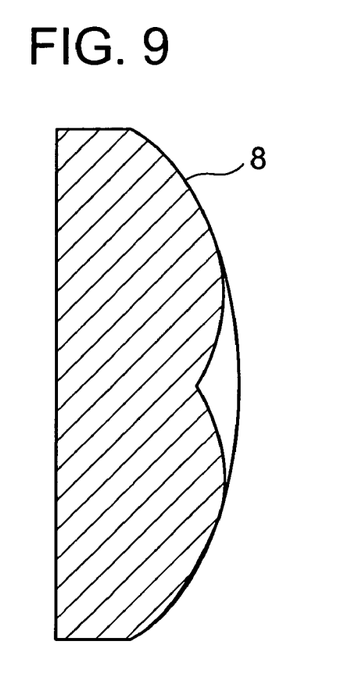
FIG. 9 is a sectional view of the condenser lens shown in FIG. 8 taken along the line C-C' in the same figure.

In addition, a condenser lens 8 may be used which has, as shown in FIGS. 8 and 9, a flat surface on one lens surface and a convex surface with a recess portion provided at a central portion thereof on the other lens surface thereof. This condenser lens 8 may be disposed with either of the lens surfaces thereof directed towards the light source.

The mirror tunnel 10 is a transparent prism and is provided along the optical axis K. This mirror tunnel 10 is made such that incident light from a light incident surface 10a is guided in the optical axis direction while totally reflected on an interface between sides of the mirror tunnel 10 and an outside air layer so as to be allowed to emerge from a light emerging surface 10b as a bundle of rays in which luminous intensity distribution is uniform. Note that an angular tube in which a reflecting film is provided on the entirety of an inner circumferential surface thereof may be used as the mirror tunnel like this.

The color wheel 9 is a circular rotary disc and includes color filters of red, blue and green which are arranged in a circumferential direction. The color wheel 9 is disposed with its rotating central axis X made to deviate to a side of the optical axis K.

The lens 21 is such as to project light that emerges from the mirror tunnel 10 on to the micro mirror device 22. In FIG. 2, while the lens 21 is illustrated as a single lens element, the lens 21 may be made up of a plurality of lens elements.

The micro mirror device 22 is such as to form individual pixels for an image to be displayed by a plurality of micro mirrors and then change over light and shade of the pixels by changing over the inclination of the micro mirrors so as to project the image.

The micro mirrors are formed of extremely thin metallic pieces such as aluminum pieces and have vertical and horizontal widths which range from 10 μm to 20 μm. These micro mirrors are provided, respectively, on a plurality of mirror drive elements (not shown) such as CMOS which are formed into a matrix-like arrangement in row and column directions.

The projection lens 23 is such as to enlarge and project reflected light from the micro mirror device 22 on to a screen (not shown). In FIG. 2, note that the projection lens 23 is illustrated as a single lens element, the projection lens 23 may be made up of a plurality of lens elements.

Note that an example of dimensions and positional relationships of the members making up the light source unit in this embodiment will be described.

When a reflector is used which has a Korenick constant of −0.55106, a radius of curvature of 10.97669, a light emitting opening whose radius is 32.5 mm and a lamp accommodation opening whose radius is 11 mm, a condenser lens 6 will be used which has the following dimensions.

Figure 10:
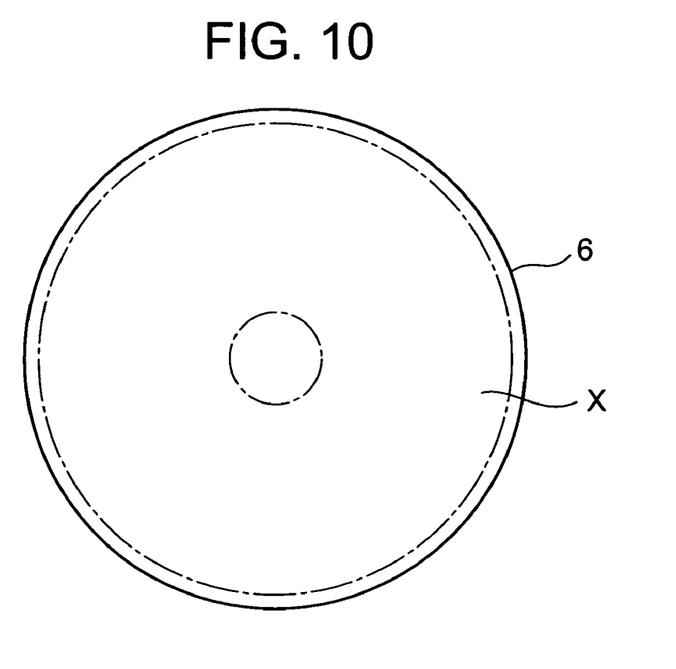
FIG. 10 is a front view of a side A of a condenser lens.
Figure 11:
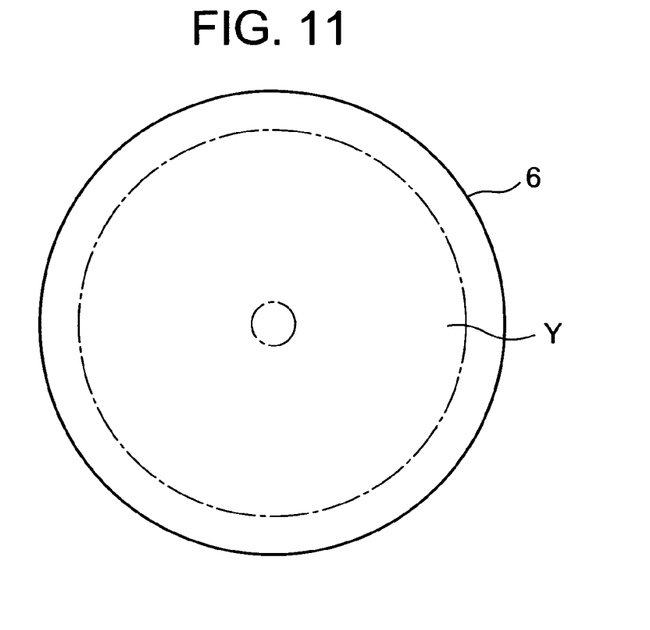
FIG. 11 is a front view of a side B of the condenser lens.

FIG. 10 is a front view of a light source 5 side (hereinafter, appropriately referred to as a "side A") of the condenser lens 6. The radius of this lens surface is 8.3 mm. As shown in FIG. 10, an effective range X of the lens surface on the side A is within a range which is outside a range defined by a circle centered at the center point of the recess portion and having a radius of 1.5 mm and inside a range defined by a circle centered at the center point of the recess portion and having a radius of 7.8 mm+/−0.1 mm. FIG. 11 is a front view of a mirror tunnel 10 side (hereinafter, appropriately referred to as a "side B") of the condenser lens 6. As shown in FIG. 11, an effective range Y of the lens surface on the side B is a range which is outside a range defined by a circle centered at the center point of the recess portion and having a radius of 0.8 mm and inside a range defined by a circle centered at the center point of the recess portion and having a radius of 7.0 mm.

Figure 12:
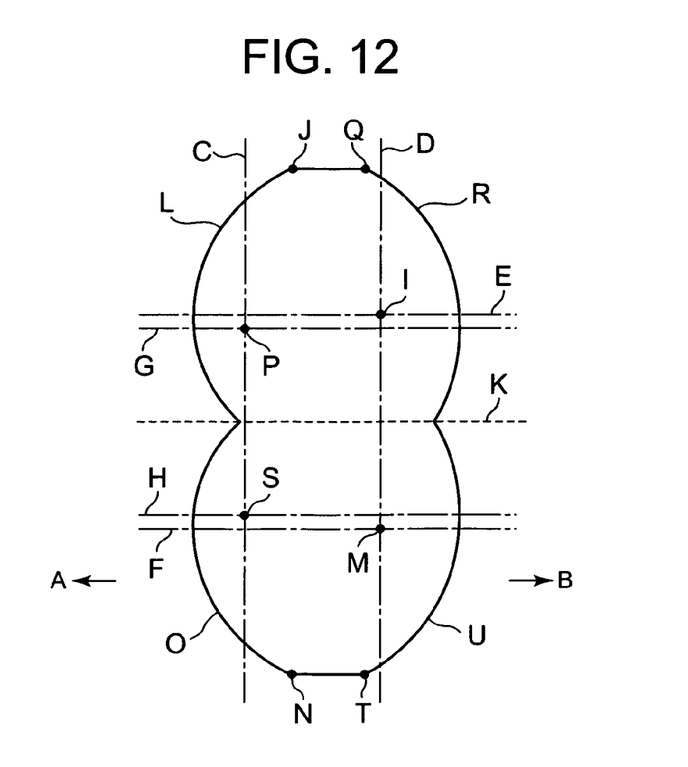
FIG. 12 is diagram which shows reference lines drawn on the sectional view taken along the line A-A' of the condenser lens.

FIG. 12 shows a sectional view of the condenser lens 6, and in order to make clear the dimensions of the condenser lens 6 below, firstly, how to draw reference lines will be described using FIG. 12.

A reference line C, which intersects with the optical axis K at right angles, is drawn in such a manner as to pass through the center of the recess portion on the lens surface on the side A of the condenser lens 6, and a reference line D is drawn in such a manner as to intersect with the optical axis K at right angles at a position 4 mm apart from the reference line C along the optical axis K towards the side B.

Next, draw reference lines E, F, respectively, from apex portions of convex portions on the lens surface on the side B of the condenser lens 6 to the reference line D in such a manner as to be parallel to the optical axis K. In addition, draw reference lines G, H, respectively, also from apex portions of convex portions on the lens surface on the side A of the condenser lens 6 similarly in such a manner as to be parallel to the optical axis K.

An arc L, which has a radius equal to a distance from a point I where the reference line D intersects with the reference line E at right angles to an end portion J of a circumferential edge portion of the condenser lens 6 and which is centered at the point I, is formed from the end portion J towards the optical axis K.

In addition, an arc O, which has a radius equal to a distance from a point M where the reference line D intersects with the reference line F at right angles to an end portion N of a circumferential edge portion of the condenser lens 6 and which is centered at the point M, is formed from the end portion N towards the optical axis K. Then, a point where the arc L intersects with the arc O constitutes a central portion of the recess portion on the lens surface on the side A.

In addition, an arc R, which has a radius equal to a distance from a point P where the reference line C intersects with the reference line G at right angles to an end portion Q of a circumferential edge portion of the condenser lens 6 and which is centered at the point P, is formed from the end portion Q towards the optical axis K.

Additionally, an arc U, which has a radius equal to a distance from a point S where the reference line C intersects with the reference line H at right angles to an end portion T of a circumferential edge portion of the condenser lens 6 and which is centered at the point S, is formed from the end portion T towards the optical axis K. Then, a point where the arc R intersects with the arc U constitutes a central portion of the recess portion on the lens surface on the side B.

Next, the dimensions of respective portions of the condenser lens 6 will be described in detail. The distance of a line which connects the point I and the point M together is 7 mm and the distance of a line which connects the point P and the point S together is 6 mm. In addition, the radii of the arc L and the arc O are 5.5 mm, respectively, and the radii of the arc R and the arc U are 6.4 mm, respectively.

Figure 13:
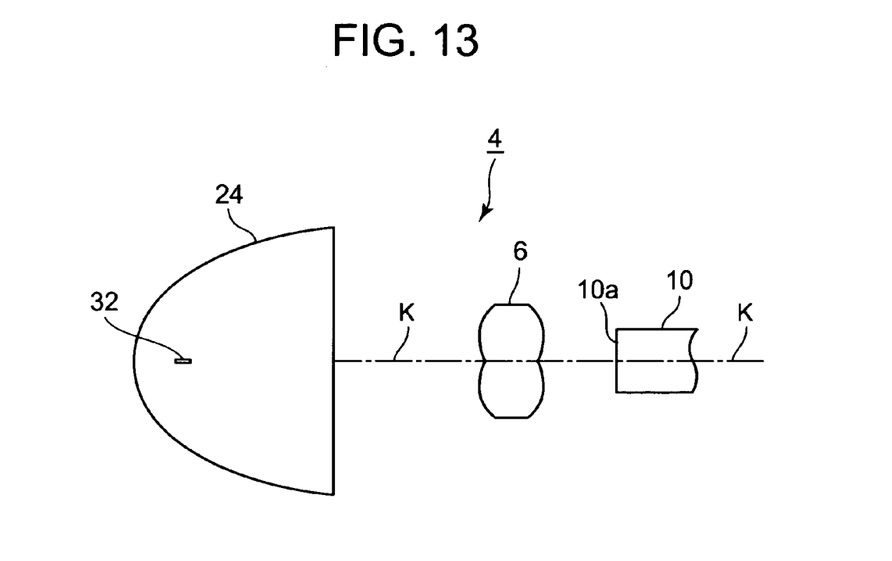
FIG. 13 is an exemplary diagram which shows a positional relationship between members making up a light source unit.

FIG. 13 is a longitudinal sectional view of the light source unit 4 which illustrates positional relationships of the members which make up the light source unit 4. Note that in FIG. 13, the illustration of the color wheel 9 is omitted in order to make clear the positional relationships.

The ark 32 is disposed in such a manner as to lie on the optical axis K at a position 5.6 mm apart from a proximal portion of the reflector 24. The condenser lens 6 is disposed in such a manner that a point where a line which connects together the convex portions on the lens surface on the side A intersects with the optical axis K at right angles lies at a position 30.5 mm apart from the arc 32. In addition, the mirror tunnel 10 is disposed in such a manner that a distance from the arc 32 to a point where the light incident surface 10a intersects with the optical axis K equals to a distance of not more than 44.5 mm.

Next, the function of the embodiment of the invention will be described.

When the projector system 1 is activated, light is radiated from the bulb 30 of the light source 5, and most of the light so radiated illuminates the internal wall of the reflector 24 to which a planishing treatment is applied to provide a mirror reflection effect.

As this occurs, as shown in FIG. 3, since the bulb 30 of the light source 5 is disposed near the lamp accommodation opening 26 within the reflector 24 in such a manner that the focal point position of the radiated light radiated from the bulb 30 and reflected by the internal wall of the reflector 24 is formed further forward in the reflected light traveling direction than a distal end portion of the electrode introducing portion 31 which faces the condenser lens 6, most of the reflected light is made to illuminate portions of the condenser lens 6 other than the central portion thereof where the recess portion is provided so as to be gathered.

The light, which has been made to illuminate the condenser lens 6 so as to be gathered, is then made to illuminate the color wheel 9 so as to be converted into three colors of red, green and blue and thereafter is made to illuminate the light incident surface 10a of the mirror tunnel 10.

The light that has emerged from the mirror tunnel 10 is made to illuminate the micro mirror device 22 after a bundle of rays thereof has been enlarged by the lens 21. Then, the light, which has been reflected by the micro mirror device 22, is then enlarged by the projection lens 23 so as to be projected on to a screen, not shown.

Thus, according to the invention, since the focal point position of the radiated light that is radiated from the bulb 30 and is reflected by the reflector 24 does not lie on the electrode introducing portion 31, there occurs no case where most of the radiated light impinges on the electrode introducing portion 31 of the lamp to thereby be dampened, and hence, the loss of the radiated light that illuminates the lens can be reduced, so that the utilization efficiency of radiated light that is radiated from the light source 5 can be enhanced, whereby the reflector 24 can be made smaller in size. Thus, the whole of the light source unit 4 can be made smaller in size than the related art light source unit.

In addition, since the light source unit 4 is made smaller in size in this way, the projector system 1 itself, which incorporates therein the light source unit 4, can be made smaller in size.

What is claimed is:

1. A light source unit comprising:
   a reflector whose internal surface is planished to provide a mirror reflection effect and which is formed with a lamp accommodation opening and a light emitting opening;
   a light source comprising a bulb which radiates light and a lamp including an electrode introducing portion that guides electrodes into the bulb; and
   a condenser which lies on an optical axis of the light radiated from the lamp and which is adapted to gather the light that is radiated from the lamp and that is reflected on the reflector;
   wherein the condenser comprises a lens having a recessed portion which is formed in a central portion of at least one of lens surfaces thereof;
   wherein the lamp is inserted into an interior of the reflector from the lamp accommodation opening; and
   wherein the bulb is disposed such that a focal point of the radiated light that is reflected on an inner wall of the reflector is not positioned on the electrode introducing portion but is positioned between the electrode introducing portion and a light gathering surface of the condenser such that a circle centered at the optical axis of the light emitted from the light source is formed in the position of the focal point.

2. The light source unit as set forth in claim 1, wherein the lens of the condenser is a convex lens having the recessed portions provided at the central portions on both of the lens surfaces thereof.

3. The light source unit as set forth in claim 1, wherein the lens of the condenser is a convex lens having the recessed portion provided at the central portion on one of the lens surfaces thereof.

4. The light source unit as set forth in claim 1, wherein the lens of the condenser has one lens surface formed into a flat plane and the other lens surface formed into a convex plane having the recessed portion at the central portion thereof.

5. A projector system comprising:
   a light source unit comprising: (i) a reflector whose internal surface is planished to provide a mirror reflection effect and which is formed with a lamp accommodation opening and a light emitting opening, (ii) a light source comprising a bulb which radiates light and a lamp including an electrode introducing portion that guides electrodes into the bulb, and (iii) a condenser which lies on an optical axis of the light radiated from the lamp and which is adapted to gather the light that is radiated from the lamp and that is reflected on the reflector,
   wherein the condenser of the light source unit comprises a lens having a recessed portion which is formed in a central portion of at least one of lens surfaces thereof,
   wherein the lamp is inserted into an interior of the reflector from the lamp accommodation opening, and
   wherein the bulb is disposed such that a focal point of the radiated light that is reflected on an inner wall of the reflector is not positioned on the electrode introducing portion but is positioned between the electrode introducing portion and a light gathering surface of the condenser such that a circle centered at the optical axis of the light emitted from the light source is formed in the position of the focal point;
   a mirror tunnel which guides light that emerges from the condenser lens;
   a lens which gathers light that emerges from the mirror tunnel;
   a micro mirror device which receives light that emerges from the lens so as to project an image; and
   a projection lens which enlarges the image projected by the micro mirror device.

6. The projector system as set forth in claim 5, wherein the lens of the condenser of the light source unit is a convex lens having the recessed portions provided at the central portions on both of the lens surfaces thereof.

7. The projector system as set forth in claim 5, wherein the lens of the condenser of the light source unit is a convex lens having the recessed portion provided at the central portion on one of the lens surfaces thereof.

8. The projector system as set forth in claim 5, wherein the lens of the condenser of the light source unit has one lens surface formed into a flat plane and the other lens surface formed into a convex plane having the recessed portion at the central portion thereof.

* * * * *